United States Patent
Nelson et al.

(10) Patent No.: US 7,586,566 B2
(45) Date of Patent: Sep. 8, 2009

(54) BRIGHTNESS ENHANCING FILM AND DISPLAY DEVICE HAVING THE SAME

(75) Inventors: Eric W. Nelson, Stillwater, MN (US); Wei Feng Zhang, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 340 days.

(21) Appl. No.: 11/383,690

(22) Filed: May 16, 2006

(65) Prior Publication Data

US 2006/0274237 A1    Dec. 7, 2006

Related U.S. Application Data

(60) Provisional application No. 60/686,982, filed on Jun. 3, 2005.

(51) Int. Cl.
G02F 1/1335 (2006.01)
(52) U.S. Cl. ......................................... 349/112; 349/64
(58) Field of Classification Search ................. 349/112, 349/64
See application file for complete search history.

(56) References Cited

U.S. PATENT DOCUMENTS

| | | | |
|---|---|---|---|
| 4,230,768 A | 10/1980 | Hamada et al. | |
| 4,721,377 A | 1/1988 | Fukuda et al. | |
| 5,162,390 A | 11/1992 | Tilley et al. | |
| 5,540,978 A | 7/1996 | Schrenk | |
| 5,691,846 A | 11/1997 | Benson, Jr. et al. | |
| 6,111,696 A | 8/2000 | Allen et al. | |
| 6,224,976 B1 | 5/2001 | Takushima et al. | |
| 6,355,754 B1 | 3/2002 | Olson et al. | |
| 6,368,699 B1 | 4/2002 | Gilbert et al. | |
| 6,449,093 B2 | 9/2002 | Hebrink et al. | |
| 6,613,819 B2 | 9/2003 | Johnson et al. | |
| 6,921,580 B2 | 7/2005 | Akatsu et al. | |

(Continued)

FOREIGN PATENT DOCUMENTS

JP    2005-247949    9/2005

OTHER PUBLICATIONS

Fischer et al., Polymer Material Science & Engineering Symposium, ACS, Wash., D.C., Aug. 2000.

(Continued)

*Primary Examiner*—David Nelms
*Assistant Examiner*—David Y Chung
(74) *Attorney, Agent, or Firm*—Elizabeth A. Gallo

(57) ABSTRACT

A brightness enhancing film suitable for use in a display device is disclosed herein. The film comprises: a first polymeric layer having a microstructured surface, wherein the microstructured surface comprises an array of prism elements, and a second polymeric layer disposed adjacent to the first polymeric layer on the opposite side of the microstructured surface, wherein at least one of the first and second polymeric layers comprises a UV absorber that absorbs UV light and transmits visible light, such that the brightness enhancing film has an internal percent transmission of at least 95% at 410 nm, and at most 25% at 380 nm. Also disclosed herein is a brightness enhancing film wherein the UV absorber is in a third layer disposed between the first and second layers. The brightness enhancing films disclosed herein may be used in display devices such as LCD-TVs.

21 Claims, 2 Drawing Sheets

U.S. PATENT DOCUMENTS

| | | |
|---|---|---|
| 6,974,850 B2 | 12/2005 | McMan et al. |
| 7,038,746 B2 | 5/2006 | Tominaga et al. |
| 2004/0043234 A1 | 3/2004 | Hay et al. |
| 2004/0061812 A1* | 4/2004 | Maeda .................. 349/65 |
| 2004/0202879 A1 | 10/2004 | Xia et al. |
| 2004/0228141 A1 | 11/2004 | Hay et al. |
| 2004/0241469 A1 | 12/2004 | McMan et al. |
| 2006/0027321 A1 | 2/2006 | Schaffer et al. |
| 2006/0029784 A1 | 2/2006 | Doan et al. |
| 2006/0082698 A1 | 4/2006 | Ko et al. |

OTHER PUBLICATIONS

"Light absorbing Properties of Naphthalate containing Polyesters" *Letters BP*, [Online] No. 10, Jun. 2001, pp. 1-8, XP-002397975.

* cited by examiner

BRIGHTNESS ENHANCING FILM AND DISPLAY DEVICE HAVING THE SAME

CROSS REFERENCE TO RELATED APPLICATIONS

This application claims the benefit of U.S. Provisional Patent Application No. 60/686,982, filed Jun. 3, 2005.

FIELD OF THE INVENTION

The invention relates to a UV-absorbing brightness enhancing film that is useful in display devices, particularly those that are direct-lit and operate under high brightness and temperature conditions.

BACKGROUND

Recent years have seen tremendous growth in the number and variety of display devices available to the public. Computers (whether desktop, laptop, or notebook), personal digital assistants, mobile phones, and televisions having liquid crystal displays (LCD TVs) are but a few examples. Although some of these display devices are reflective display devices that utilize ordinary ambient light to view the display panel, most are transmissive display devices that require a light source to make the display panel visible.

Transmissive display devices fall into the categories of "edge-lit" or "direct-lit". These categories differ in the placement of the light source relative to the display panel which defines the viewable area of the display device. In edge-lit display devices, a light source is disposed along an outer border of the display device, outside of the viewable area. The light source typically emits light into a light guide, a clear polymeric slab having length and width dimensions on the order of the viewable area, and from which light is extracted for illumination of the viewable area. In direct-lit display devices, a light source is disposed behind the viewable area, such that light emitted by the light source directly illuminates the viewable area. Some direct lit backlights also incorporate an edge-mounted light, and are thus capable of both direct lit and edge lit operation.

SUMMARY

Disclosed herein is a brightness enhancing film suitable for use in a display device, the film comprising: a first polymeric layer having a microstructured surface, wherein the microstructured surface comprises an array of prism elements, and a second polymeric layer disposed adjacent to the first polymeric layer on the opposite side of the microstructured surface, wherein at least one of the first and second polymeric layers comprises a UV absorber that absorbs UV light and transmits visible light, such that the brightness enhancing film has an internal percent transmission of at least 95% at 410 nm, and at most 25% at 380 nm. The brightness enhancing film disclosed herein may alternatively comprise a third layer disposed between the first and second polymeric layers and which comprises the UV absorber.

Also disclosed herein is a display device comprising a display panel; a light source; a reflective polarizer disposed between the display panel and the light source; the brightness enhancing films described above and disposed between the reflective polarizer and the light source, the first polymeric layer disposed opposite the reflective polarizer; and wherein the light source illuminates the display panel through the brightness enhancing film and the reflective polarizer.

These and other aspects will be apparent from the detailed description below. In no event, however, should the above summaries be construed as limitations on the claimed subject matter, which subject matter is defined solely by the attached claims, as may be amended during prosecution.

DETAILED DESCRIPTION

Figure 1A:
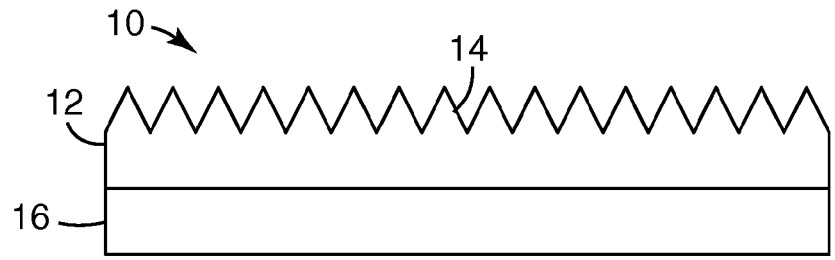
FIGS. 1a and 1b show exemplary brightness enhancing films.

The operating environments inside of LCD TVs are becoming significantly more harsh as compared to other display devices. For one, an LCD TV is a direct-lit display device, and so does not benefit from the UV absorbing capacity of a light guide present in an edge-lit device. As such, the cavity of an LCD TV is bombarded with harmful UV radiation from the light source, and any component inside the cavity that absorbs UV radiation is subject to degradation. LCD TVs are also expected to have much higher brightness and much longer product lifetimes as compared to other direct-lit display devices, and to meet these demands, light sources having very high intensities are being, used. As a result, the temperature inside of an LCD TV may reach up to 65-85° C., as compared to 30-45° C. for most other display devices. In addition, high intensity light sources that are being manufactured for LCD TVs have a significant peak in the UV region, particularly at 365 nm, and UV-absorbing coatings on the light sources are being eliminated by manufacturers, typically for reasons related to cost.

Multilayer optical films such as reflective polarizers are used in display devices such as LCD TVs. Multilayer optical films typically comprise alternating polymeric layers wherein the polymers are derived from components having naphthalate functionality; examples include polyethylene naphthalate (PEN) and copolymers or blends based upon naphthalene dicarboxylic acid (co-PEN). The presence of naphthalate functionality causes a reflective polarizer to degrade rapidly under the harsh operating conditions described above, as evidenced by increasing yellowness over time UV radiation of 360-400 nm may be especially damaging given the absorption spectrum of the PEN-containing polymers. This radiation will transmitted by typical polymers, such as acrylates, styrenes or polycarbonates used in diffuser plates, but will be absorbed by PEN, causing yellowing.

It is thus desirable to prevent degradation of PEN-containing multilayer optical films. One solution is to incorporate one or more UV absorbers into a brightness enhancing film which is disposed between a reflective polarizer and light sources within a display device. This solution may provide an extra benefit in which the brightness enhancing film is also protected against degradation. It is difficult, however, to implement this solution because the presence of most UV absorbers impart undesirable yellowness at the display panel of the display device.

In general, it is difficult to find UV absorbers that work well in a particular application, especially if minor differences in UV absorption have detrimental effects on performance. Ideally, one should be able to pick and choose from a variety of UV absorbers, each having a sharp absorption cutoff on the long wavelength side, but UV absorbers having these properties do not exist, hence the large number of commercially available UV absorbers.

It has been found that if a UV absorber is present in the brightness enhancing film such that the film has particular absorption properties, degradation of PEN-containing multilayer optical films can be reduced with little or no additional yellowness. The particular properties pertain to the internal percent transmission (% T) of a film at two different wavelengths. Internal percent transmission is the intrinsic transmission of the film, i.e., it does not take into account any surface reflections. (In general, a film can have an internal percent transmission up to 100%, and if surface reflections are taken into account, the total transmission can be up to about 92%.)

In particular, it is desirable that the brightness enhancing film exhibit as little internal percent transmission at 380 nm as possible, for example, at most 25%, or at most 15%. This helps to filter out UV radiation from high intensity light sources that are newly available for use in LCD TVs. Also, in particular, the brightness enhancing film desirably exhibits as much internal percent transmission at 410 nm as possible, for example, at least 95%, so that it does not cause yellowness at the display panel. Thus, the UV absorber present in the brightness enhancing film must have a high extinction coefficient at 380 nm and a sharp cut-off on the long wavelength side.

The UV absorber may comprise a benzotriazole, benzatriazine, benizophenone, or a combination thereof; or it may, be any of those described in U.S. 2004/0241469 A1; U.S. 2004/10242735 A1; and U.S. Pat. No. 6,613,819 B2; all incorporated herein by reference for all that they contain. Particular examples include CGL 139, CGL 777, and Tinuvin® 327, 460, 479, 480, 777, 900, and 928; all from Ciba Specialty Chemicals. The UV absorber may also comprise a combination of UV absorbers, for example, CGL 479 in combination with CGL 777.

The amount of the UV absorber used in the brightness enhancing film depends on a variety of factors such as its extinction coefficient, the amount of naphthalate functionality in the multilayer optical film, and the spectrum of light emitted by the light sources. The amount used may also depend on the thickness of the layer into which the UV absorber is incorporated. In particular, for a layer having a thickness of 178 nm (7 mil), 2 wt. % CGL-139 gives 23% T at 380 nm, and 95.0% T at 410 nm. For a layer having a thickness of 178 um (7 mil), 3 wt. % Tinuvin 327 and 1 wt. % CGL-139 give 4.5% T at 380 nm, and 95.9% T at 410 nm. Brightness enhancing films recycle light, so the necessary amount of the UV absorber may need to be determined by considering the total number of passes of light therethrough.

Degradation of the naphthalate-containing multilayer optical film can be determined by measuring the change in yellowness, or $\Delta b^*$, as is known in the CIE L*a*b* color space, developed by the Commission Internationale de l'Eclairage in 1976. A widely used method for measuring and ordering color, CIE L*a*b* color space is a three-dimensional space in which a color is defined as a location in the space using the terms L,*, a*, and b*. L* is a measure of the lightness of a color and ranges from zero (black) to 100 (white) and may be visualized as the z-axis of a typical three-dimensional plot having x-, y- and z-axes. The terms a* and b* define the hue and chroma of a color and may be visualized as the x- and y-axes, respectively. The term a* ranges from a negative number (green) to a positive number (red), and the term b* ranges from a negative number (blue) to a positive number (yellow). Thus, b*, as used herein, relates to the yellowness of an article. For a complete description of color measurement, see "Measuring Color", 2nd Edition by R. W. G. Hunt, published by Ellis Horwood Ltd., 1991. In general, b* for the brightness enhancing film is about 2.5 or less, otherwise it appears too yellow.

The amount of UV absorber used in the brightness enhancing film may also depend on desired performance criteria. For LCD TVs, it has been found that the naphthalate-containing multilayer optical film should exhibit $\Delta b^*$ of at most 4, preferably less than 2.5, after exposure to irradiation at 380 nm at an intensity 5 to 10 mW/cm² for 200 hours and 65° C. In some applications, it is especially desirable that $\Delta b^*$ be less than about 1 after 12 days, Brightness Enhancing Film In general, brightness enhancing films are often used in display devices for increasing the brightness of the display panel. These optical articles recycle light through a process of reflection and refraction that ultimately helps to direct light toward a viewer (usually positioned directly in front of the display device) that would otherwise leave the screen at a high angle, missing the viewer. A comprehensive discussion of the behavior of light in a brightness enhancement film may be found, for example, in U.S. Ser. No. 11/283,307. Examples include the Vikuiti™ BEFII and BEFIII family of prismatic films available from 3M Company, including BEFII 90/24, BEFII 90/50, BEFIIIM 90/50, and BEFIIIT.

FIG. 1a shows a schematic crosssection of an exemplary brightness enhancement film 10 comprising first polymeric layer 12 having microstructured surface 14. Second polymeric layer 16 is disposed opposite the microstructured surface. The microstructured surface comprises an array of prisms for directing light as described above. The microstructured surface may also comprise, for example, a series of shapes including ridges, posts, pyramids, hemispheres and cones, and/or they may be protrusions or depressions having flat, pointed, truncated, or rounded parts, any of which may have angled or perpendicular sides relative to the plane of the surface. An lenticular microstructure may be useful, for example, the microstructured surface may comprise cube corner elements, each having three mutually substantially perpendicular optical faces that typically intersect at a single reference point, or apex. The microstructured surface may have a regularly repeating pattern, be random, or a combination thereof. In general, the microstructured surface comprises one or more features, each feature having at least two lateral dimensions (i.e. dimensions in the plane of the film) less than 2 mm.

The surface of the first polymeric layer which is opposite the microstructured surface, is generally planar and may be smooth (any structures thereon are small in comparison to the size of the structures on the microstructured surface) or matte to help hide the light sources, as described below for a display device.

The first polymeric layer may be prepared using a polymerizable composition, a master having a negative microstructured molding surface, and a preformed second polymeric layer sometimes referred to as a base layer. The polymerizable composition is deposited between the master and the second polymeric layer, either one of which is flexible, and a bead of the composition is moved so that the composition fills the microstructures of the master. The polymerizable composition is polymerized to form the layer and is then separated from the master. The master can be metallic, such as nickel, nickel-plated copper or brass, or can be a thermoplastic material that is stable under the polymerizing conditions and that preferably has a surface energy that permits clean removal of the polymerized layer from the master.

The first polymeric layer with the microstructured surface may have a thickness of from about 10 to about 200 um.

The polymerizable composition may comprise monomers including mono-, di-, or higher functional monomers, and/or oligomers, and preferably, those having a high index of refraction, for example, greater than about 1.4 or greater than about 1.5. The monomers and/or oligomers may be polymerizable using UV radiation. Suitable materials include (meth) acrylates, halogenated derivatives, telechelic derivatives, and the like, for example, those described in U.S. Pat. Nos. 4,568, 445; 4,721,377; 4,812,032; 5,424,339; and 6,355,754; all incorporated herein by reference. A preferable polymerizable composition is described in U.S. Ser. No. 10/747,985, filed on Dec. 30, 2003, and which is incorporated herein by reference. This polymerizable composition comprises a first monomer comprising a major portion of 2-propenoic acid, (1-methylethylidene)bis[(2,6-dibromo-4,1-phenylene)oxy(2-hydroxy-3,1-propanediyl)] ester; pentaerythritol tri(meth)acrylate; and phenoxyethyl (meth)acrylate.

The UV absorber needs to be selected so as to not interfere with UV curing of the first polymeric layer. The UV radiation used to cure the first polymeric layer may be emitted on the side of the second polymeric layer opposite the first polymeric layer, or on the same side.

The second polymeric layer of the brightness enhancement film may be described as a base layer. This layer may comprise any material suitable for use in an optical product, i.e., one that is optically clear and designed to control the flow of light. Depending on the particular application, the second polymeric layer may need to be structurally strong enough so that the brightness enhancement film may be assembled into a display device. Preferably, the second polymeric layer adheres well to the first polymeric layer and is sufficiently resistant to temperature and aging such that performance of the display device is not compromised over time. Materials useful for the second polymeric layer include polyesters such as polyethylene terephthalate, polyethylene naphthalate, copolyesters or polyester blends based on naphthalene dicarboxylic acids; polycarbonates; polystyrenes; styrene-acrylonitriles; cellulose acetates; polyether sulfones; poly(methyl)acrylates such as polymethylmethacrylate; polyurethanes; polyvinyl chloride; polycyclo-olefins; polyimides; glass; or combinations or blends thereof. The second polymeric layer may also comprise a naphthalate-containing multilayered optical film as described in U.S. Pat. No. 6,111,696, which is incorporated herein by reference.

The UV absorber may be present in the first polymeric layer and/or the second polymeric layer. In one example, the first polymeric layer comprises the UV absorber and the second polymeric layer does not. Alternatively, the second polymeric layer comprises the UV absorber and the first polymeric layer does not. The first and second polymeric layers may each comprise the UV absorber.

Figure 1B:
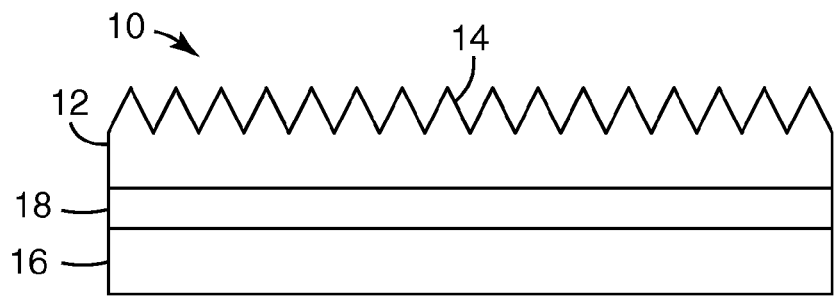

The brightness enhancing film may also comprise, as shown in FIG. 1b: a first polymeric layer 12 having a microstructured surface 14, wherein the microstructured surface comprises an array of prism elements, a second polymeric layer 16 disposed adjacent to the first polymeric layer on the opposite side of the microstructured surface, and a third layer 18 disposed between the first and second polymeric layers. The third layer may have any function in the brightness enhancing film. For example, it may be present to provide UV absorptivity to the brightness enhancing film as described below, or it may be an adhesive layer, an antistatic layer, etc., or some combination thereof.

Also disclosed herein is a brightness enhancing film suitable for use in a display device, the film comprising: a first polymeric layer having a microstructured surface, wherein the microstructured surface comprises an array of prism elements, a second polymeric layer disposed adjacent to the first polymeric layer on the opposite side of the microstructured surface, and a third layer disposed between the first and second polymeric layers, wherein the third layer comprises a UV absorber that absorbs UV light and transmits visible light, such that the brightness enhancing film has an internal percent transmission of at least 95% at 410 nm, and at most 25% at 380 nm. Besides providing UV absorptivity, the third layer may also function as an adhesive layer, an antistatic layer, etc., or some combination thereof The UV absorber may only be present in the third layer, such that the first and second polymeric layers do not comprise a UV absorber. Alternatively, the first and/or second polymeric layers may comprise a UV absorber.

The third layer may consist essentially of the UV absorber. The third layer may also comprise additional materials depending on whether the third layer functions as an adhesive layer, an antistat layer, etc. The third layer may comprise additional materials that are compatible with the UV absorber and facilitate formation of a third layer having an even distribution of the UV absorber. Additional materials comprise polymers and pre-polymeric components that are cured using actinic or thermal radiation after coating. In any case, any additional material used in the third layer should not interfere with the optical performance of the brightness enhancing film.

For third layers comprising the adhesive layer, UV-curable adhesives may be prepared and compounded with the UV absorber. One type of suitable adhesive comprises the reaction product of at least one nitrogen-containing polymer and at least one polymerizable ethylenically unsaturated diluent. Examples of such adhesives are described in U.S. 2004/0202879; U.S. 2006/027321 A1 and U.S. 2006/029784 A1, the disclosures of which are incorporated herein by reference. Adhesives having the following materials are useful:

Ageflex™ PEA (from CIBA)=phenoxy ethyl acrylate

Luviskol Plus™ (from BASF)=homopolymer of vinylcaprolactam

Sartomer CD9038=ethoxylated Bisphenol A diacrylate

Lucrin TPO (from BASF)=diphenyl(2,4,6-trimethylbenzoyl)phosphine oxide

Irganox® 1010 (from CIBA)=hindered phenol

Etermer™ 210 (from Eternal Chemical)=phenoxy ethyl acrylate

PVP/VA E-335 (from International Specialty Products)= linear, random copolymer of vinylpyrrolidone and vinyl acetate (at 30/70 molar ratio)

Ebecryl® 270 (from UCB Radcure)=aliphatic urethane diacrylate

Sartomer SR-339=phenoxy ethyl acrylate

Sartomer CD611=alkoxylated THF acrylate

Figure 2:
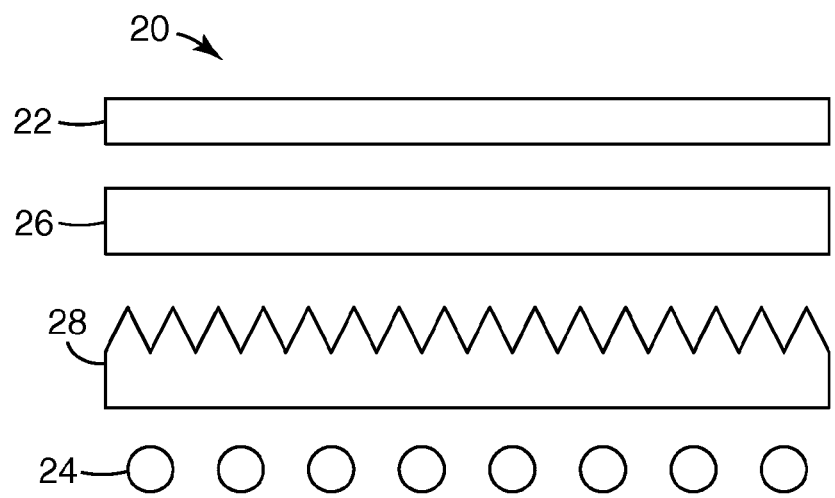
FIG. 2 shows a direct-lit display device.

Aquazol™ 50 (from International Specialty Products)=homopolyner of ethyloxazoline SIMD=copolymer of stearyl methacrylate/isobutyl methacrylate/methyl methacrylate/dimethylaminoethyl methacrylate at 10/20/20/50 wt, ratio In particular, Adhesive Compositions 1-6 described in U.S. 2006/029784 A1 are suitable:

Adhesive 1: Ageflex™ PEA/Luviskol Plus™/Sartomer CD9038/Lucrin TPO=80/10/10/1.0 wt. ratio Adhesive 2: Ageflex™ PEA/Luviskol Plus™/Sartomer CD9038/Lucrin TPO/Irganox® 1010=80/10/10/1.0/0.5 wt. ratio Adhesive 3: Etermer™ 210/E-335/Sartomer CD9038/Lucrin TPO/Irganox® 1010=75/15/10/1.0/0.5 wt. ratio Adhesive 4: Ageflex™ PEA/E-335/Sartomer CD9038/Lucrin TPO=75/15/10/1.0 wt. ratio Adhesive 5: Sartomer SR339/Aquazol™ 50/Sartomer CD611/Ebecryl® E-270/Sartomer CD9038/Lucrin TPO=65/10/15/5/5/1 wt. ratio Adhesive 6: Sartomer SR339/SIMD/Sartomer CD611/Ebecryl® E-270/Sartomer CD9038/Lucrin TPO=60/15/15/5/5/1 wt. ratio Display Devices Also disclosed herein is a display device comprising the brightness enhancing films disclosed herein. As shown in FIG. 2, the display device 20 comprises: a display panel 22, a light source 24; a reflective polarizer 26 disposed between the display panel and the light source; the brightness enhancing film 28 disposed between the reflective polarizer and the light source, the first polymeric layer opposite the reflective polarizer; and wherein the light source illuminates the display panel through the brightness enhancing film and the reflective polarizer. The display panel may be a, liquid crystal display panel. The display device may be a television. The light sources may be fluorescent light sources.

For a detailed description of the design, applications, materials, properties, manufacturing, use, etc. of display devices, see for example: U.S. Ser. No. 10/966,610; U.S. Ser. No. 11/283,307; U.S. Ser. No. 10/747,985; U.S. Pat. No. 6,744,561 B2; U.S. 2004/0228141; U.S. 2004/0241469 A1; U.S. Pat. No. 6,974,850 B2; U.S. Pat. No. 6,111,696; U.S. Pat No. 6,613,819 B2; U.S. Pat. Nos. 4,568,445; 4,721,377; 4,812,032; 5,424,339; and U.S. Pat. No. 6,355,754; all incorporated herein by reference for all that they contain.

EXAMPLES

Example A

A naphthalate-containing multilayer optical film was prepared as described in U.S. Pat. No. 6,368,699 B1. A coextruded film containing 601 layers was made on a sequential flat-film-making line via a coextrusion process. PEN with an Intrinsic Viscosity of 0.57 dl/g (as measured in a solution of 60 wt. % phenol/40 wt. % dichlorobenzene) was delivered by extruder A at a rate of 52 kg/h (114 pounds per hour) with 29 kg/h (64 pounds per hour) going to the feedblock and the rest going to skin layers described below. Polymethyl methacrylate (PMMA; CP-82 from ICI of Americas) was delivered by extruder B at a rate of 28 pounds per hour with all of it going to the feedblock. PEN was in the skin layers of the feedblock. The feedblock method was used to generate 151 layers using the feedblock such as those described in U.S. Pat. No. 3,801,429, after the feedblock two symmetric skin layers were coextruded using extruder C metering about 14 pounds per hour of the same type of PEN delivered by extruder A. This extrudate passed through two multipliers producing an extrudate of about 601 layers. U.S. Pat. No. 3,565,985 describes similar coextrusion multipliers. The extrudate passed through another device that coextruded skin layers at a total rate of 25 pounds per hour of PEN from extruder A. The web was length oriented to a draw ratio of about 3.2 with the web temperature at about 138° C. (280° F.). The film was subsequently preheated to about 154° C. (310° F.) In about 38 seconds and drawn in the transverse direction to a draw ratio of about 4.5 at a rate of about 11 percent per second. The film was then heat-set at 227° C. (440° F.) with no relaxation allowed. The finished film thickness was about 75 nm (3 mil).

Coating compositions were prepared by combining different UV absorbers with 10.56 wt. % aliphatic urethane acrylate oligomer (Photomer® 6010 from SpecialChem S.A.), 4.62 wt. % ethoxylated trimethylol propane triacrylate (Sartomer 454 from Sartomer Co.), 11.22 wt. % neopentane glycol diacrylate (SR 9003 from Sartomer Co.), 0.30 wt. % light stabilizer (Tinuvin® 123 from Ciba Specialty Chemicals), and 0.30 wt. % photoinitiator (Irgacure® 819 from Ciba Specialty Chemicals). The UV absorbers and respective amounts used in each of the multilayer optical films are summarized in Table 1.

Each coating composition was applied to the film described above, by dissolving the coating composition in ethyl acetate to form a coating solution containing 40 wt. % solids. The coating compositions were applied using a Meyer bar, dried in an oven for 1 min. at 100° C., and cured incline using a 25 cm/s (50 ft/min) line speed at coating thicknesses ranging from 6 to 35 nm in an inert atmosphere having an oxygen concentration below 100 ppm. UV photocuring energy was supplied using a high intensity FUSION D-bulb powered with 236 Joules/sec-cm input power.

TABLE 1

| Example | UV Absorber | Wt. % of UV Absorber |
|---|---|---|
| 1 | CGL 777 | 8 |
|  | CGL 479 | 4 |
| 2 | CGL 777 | 6 |
| 3 | Tinuvin ® 327 | 10 |
| 4 | CGL 139 | 6 |
| Comparative 1 | CGL 928 | 6 |
| Comparative 2 | CGL 479 | 6 |
| Comparative 3 | Tinuvin ® 405 | 6 |
| Control | none | 0 |

Figure 3:
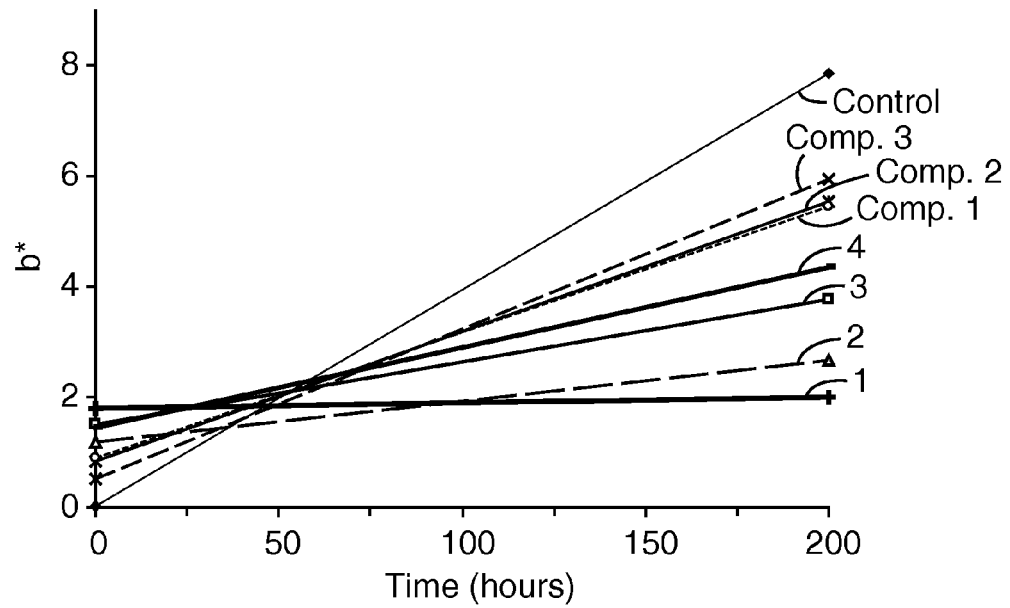
FIGS. 3 and 4 shout data obtained from testing described in the Examples.
Figure 4:
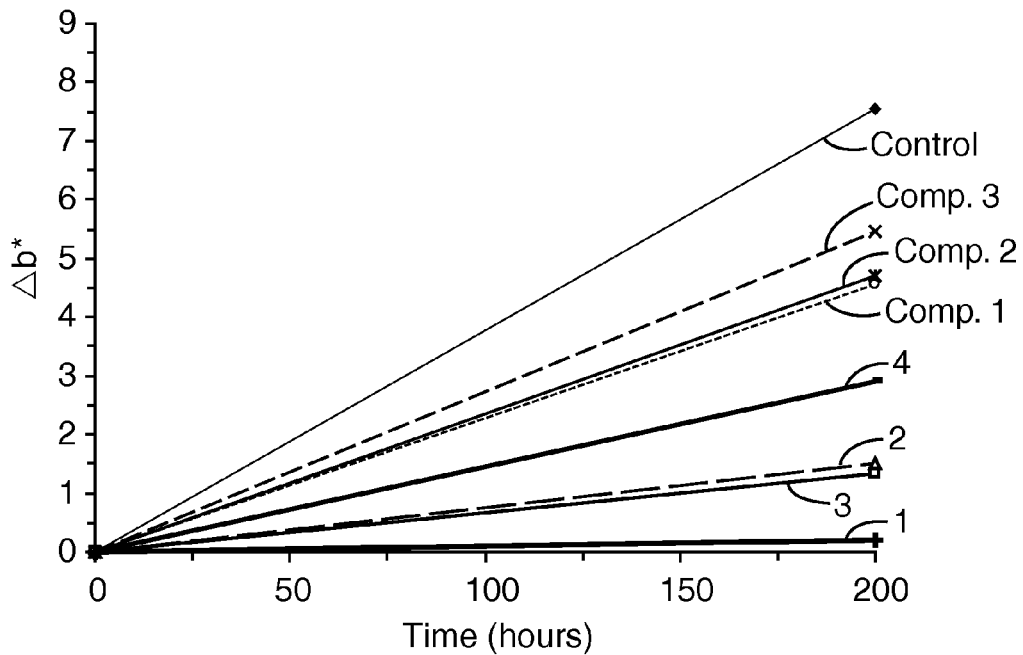

Each of the films described above were evaluated by subjecting the films to 200 hours of UV radiation at 380 nm, intensity 5 to 10 mW/cm$^2$, and temperature 65° C. The b* coordinates were measured both before and after application of the UV radiation, and the results are summarized in Table 2 and FIGS. 3 and 4. A maximum of 5 is acceptable for b*$_f$, and a maximum of 3 is acceptable for Δb*.

TABLE 2

| Example | % T at 380 nm | % T at 410 nm | b*$_i$ (0 hrs.) | b*$_f$ (200 hrs.) | Δb* |
|---|---|---|---|---|---|
| 1 | 9.2 | 99.5 | 1.8 | 2.0 | 0.2 |
| 2 | 18.8 | 99.7 | 1.2 | 2.7 | 1.5 |
| 3 | 14.0 | 98.7 | 1.5 | 3.8 | 1.3 |
| 4 | 21.2 | 94.8 | 1.4 | 4.3 | 2.9 |
| Comparative 1 | 49.5 | 100 | 0.9 | 5.5 | 4.6 |
| Comparative 2 | 89.5 | 100 | 0.8 | 5.5 | 4.7 |
| Comparative 3 | 93.6 | 100 | 0.5 | 6.0 | 5.4 |
| Control 1 | 100 | 100 | 0.03 | 7.9 | 7.5 |

The above data show that if % T at 380 is less than about 25, then b*$_f$ is less than about 4.5, and Δb* is less than about 3. The multilayer optical film used in this example was a mirror film which is expected to show the general concept of protecting naphthalate-containing reflective polarizers. Reflective polarizers and mirrors would be expected to show similar weathering behavior.

Example B

A UV-curable adhesive (Adhesive Composition 1 of U.S. 2006/029784 A1) was prepared and compounded with the UV absorbers listed in Table 3 and 1 wt. % of a hindered amine light stabilizer (Tinuvin® 123 from Ciba Specialty Chemicals). The UV-curable adhesive was 100% solids, substantially free of solvent, and comprised the following components:

- phenoxy ethyl acrylate (Ageflex PEA from CIBA) at 80 wt. %;
- homopolymer of vinylcaprolactam (Luviskol Plus from BASF) at 10 wt. %;
- ethoxylated Bisphenol A diacrylate (Sartomer CD9038) at 10 wt. %; and
- diphenyl(2,4,6-trimethylbenzoyl)phosphine oxide (Lucirin TPO from BASF) at 1 wt %.

The adhesive comprising the UV absorber and stabilizer was then used to laminate a reflective polarizer (described in U.S. Pat. No. 6,972,813 B1) between two sheets of support layers comprising 127 um (5 mil) polycarbonate. The adhesive thickness was approximately 10 um on each side of the reflective polarizer. UV photocuring energy was supplied, using a high intensity FUSION D-bulb powered with 236 Joules/sec-cm input power, in order to cure the adhesive.

TABLE 3

| Example | UV Absorber | Wt. % of UV Absorber |
|---|---|---|
| 5 | CGL 139 | 0.5 |
| 6 | CGL 139 | 1 |
| 7 | CGL 139 | 2 |
| Control 2 | none | 0 |
| 8 | Tinuvin ® 327 | 1 |
|   | CGL 139 | 0.5 |
| Control 3 | none | 0 |

Each of the laminated articles described above were tested using a QUVew light exposure apparatus equipped with Phillips F40 50 U bulbs, which have an emission spectrum similar to the cold cathode fluorescent lamps found in typical LCD-TVs. The intensity of the emission was adjusted to be 0.5 W/m$^2$ at 448 nm, which resulted in a UV intensity of 1.71 W/m$^2$ integrated over 340-400 nm. The chamber temperature during the exposure was 83° C. and the length of the exposure was 12 days.

The b* coordinates were measured both before and after exposure and the results are shown in Table 4. For Examples 7 and 8. Beer's law was used to calculate internal percent transmission values for 7 um thick adhesive layers, after measuring molar absorption coefficients for the UV absorbers.

TABLE 4

| Example | % T at 380 nm | % T at 410 nm | b*$_i$ (0 hrs.) | b*$_f$ (12 days) | Δb* |
|---|---|---|---|---|---|
| 5 | ND | ND | 2.75 | 3.48 | 0.73 |
| 6 | ND | ND | 3.08 | 3.78 | 0.69 |
| 7 | 22 | 95 | 2.62 | 3.21 | 0.59 |
| Control 2[1] | ND | ND | 2.05 | 3.10 | 1.05 |
| 8 | 31 | 98 | 2.21 | 3.02 | 0.82 |
| Control 3[2] | ND | ND | 1.82 | 3.73 | 1.91 |

ND = not determined
[1] Control 2 was tested with Examples 5-7
[2] Control 3 was tested with Example 8

Various modifications and alterations of this invention will be apparent to those skilled in the art without departing from the scope and spirit of this invention, and it should be understood that this invention is not limited to the illustrative embodiments set forth herein. All U.S. patents, patent application publications, and other patent and non-patent documents referred to herein are incorporated by reference for all that they contain, to the extent they are not inconsistent with the foregoing disclosure.

What is claimed is:

1. A brightness enhancing film suitable for use in a display device, the film comprising:
    a first polymeric layer having a microstructured surface, wherein the microstructured surface comprises an array of prism elements, and
    a second polymeric layer disposed adjacent to the first polymeric layer on the opposite side of the microstructured surface,
    wherein at least one of the first and second polymeric layers comprises a UV absorber that absorbs UV light and transmits visible light, such that the brightness enhancing film has an internal percent transmission of at least 95% at 410 nm, and at most 25% at 380 nm.

2. The brightness enhancing film of claim 1, wherein the first polymeric layer comprises the UV absorber and the second polymeric layer does not.

3. The brightness enhancing film of claim 1, wherein the second polymeric layer comprises the UV absorber and the first polymeric layer does not.

4. The brightness enhancing film of claim 1, wherein the first and second polymeric layers each comprise the UV absorber.

5. The brightness enhancing film of claim 1, wherein b* is about 2.5 or less.

6. The brightness enhancing film of claim 1, wherein the internal percent transmission at 380 nm is at most 15%.

7. The brightness enhancing film of claim 1, wherein the film exhibits Δb* of at most 4 after exposure to irradiation at 380 nm at an intensity 5 to 10 mW/cm$^2$ for 200 hours and 65° C.

8. The brightness enhancing film of claim 1, wherein the UV absorber is a benzotriazole, benzatriazine, benzophenone, or a combination thereof.

9. A brightness enhancing film suitable for use in a display device, the film comprising:
    a first polymeric layer having a microstructured surface, wherein the microstructured surface comprises an array of prism elements,
    a second polymeric layer disposed adjacent to the first polymeric layer on the opposite side of the microstructured surface, and
    a third layer disposed between the first and second polymeric layers,
    wherein the third layer comprises a UV absorber that absorbs UV light and transmits visible light, such that the brightness enhancing film has an internal percent transmission of at least 95% at 410 nm, and at most 25% at 380 nm.

10. The brightness enhancing film of claim 9, wherein the first and second polymeric layers do not comprise a UV absorber.

11. The brightness enhancing film of claim 9, wherein the first and/or second polymeric layers comprise a UV absorber.

12. The brightness enhancing film of claim 9, wherein b* is about 2.5 or less.

13. The brightness enhancing film of claim 9, wherein the internal percent transmission at 380 nm is at most 15%.

14. The brightness enhancing film of claim 9, wherein the film exhibits Δb* of at most 4 after exposure to irradiation at 380 nm at an intensity 5 to 10 mW/cm$^2$ for 200 hours and 65° C.

15. The brightness enhancing film of claim 9, wherein the UV absorber is a benzotriazole, benzatriazine, benzophenone, or a combination thereof.

16. A display device comprising:
- a display panel;
- a light source;
- a reflective polarizer disposed between the display panel and the light source;
- the brightness enhancing film of claim 1 disposed between the reflective polarizer and the light source, the first polymeric layer opposite the reflective polarizer; and
- wherein the light source illuminates the display panel through the brightness enhancing film and the reflective polarizer.

17. The display device of claim 16, wherein the display panel is a liquid crystal display panel.

18. The display device of claim 16, wherein the display device is a television.

19. A display device comprising:
- a display panel;
- a light source;
- a reflective polarizer disposed between the display panel and the light source;
- the brightness enhancing film of claim 9 disposed between the reflective polarizer and the light source, the first polymeric layer opposite the reflective polarizer; and
- wherein the light source illuminates the display panel through the brightness enhancing film and the reflective polarizer.

20. The display device of claim 19, wherein the display panel is a liquid crystal display panel.

21. The display device of claim 19, wherein the display device is a television.

* * * * *